United States Patent
Lababidy et al.

(10) Patent No.: US 8,687,461 B2
(45) Date of Patent: Apr. 1, 2014

(54) MARINE SEISMIC SOURCE HANDLING SYSTEM

(75) Inventors: Said El Lababidy, Asker (NO); Sriram Prasanna Jagannathan, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 909 days.

(21) Appl. No.: 12/548,787

(22) Filed: Aug. 27, 2009

(65) Prior Publication Data

US 2010/0054896 A1 Mar. 4, 2010

Related U.S. Application Data

(60) Provisional application No. 61/093,627, filed on Sep. 2, 2008.

(51) Int. Cl.
*G01V 1/38* (2006.01)

(52) U.S. Cl.
USPC .............................. 367/16; 114/253; 114/244

(58) Field of Classification Search
USPC ..................................... 114/253, 244; 367/16
See application file for complete search history.

(56) References Cited

U.S. PATENT DOCUMENTS

| | | | |
|---|---|---|---|
| 4,869,191 A * | 9/1989 | Ayers | 114/253 |
| 5,351,218 A | 9/1994 | Hatteland et al. | |
| 6,604,482 B1 | 8/2003 | Martello | |
| 6,684,160 B1 | 1/2004 | Ozbek et al. | |
| 7,400,552 B2 | 7/2008 | Moldoveanu et al. | |
| 7,415,936 B2 | 8/2008 | Storteig et al. | |
| 7,426,439 B2 | 9/2008 | Ozdemir et al. | |
| 7,466,625 B2 | 12/2008 | Robertsson et al. | |
| 7,660,191 B2 | 2/2010 | Robertsson | |
| 7,796,466 B2 | 9/2010 | Combee et al. | |
| 2008/0008037 A1 | 1/2008 | Welker | |
| 2008/0186804 A1 | 8/2008 | Amundsen et al. | |
| 2008/0267010 A1 | 10/2008 | Moldoveau et al. | |
| 2009/0003132 A1 | 1/2009 | Vassallo et al. | |
| 2009/0141587 A1 | 6/2009 | Welker et al. | |

* cited by examiner

*Primary Examiner* — Mark Hellner

(57) ABSTRACT

A method, according to one or more aspects of the present disclosure, includes positioning an elevated handling beam in a slip of a marine vessel, the handling beam extending from an inboard position to a outboard positioned proximate to an open slipway; and moveably positioning a handling winch on the handling beam, the handling winch capable of selectively connecting with a gun assembly and moving the gun assembly vertically and laterally relative to the handling beam.

19 Claims, 6 Drawing Sheets

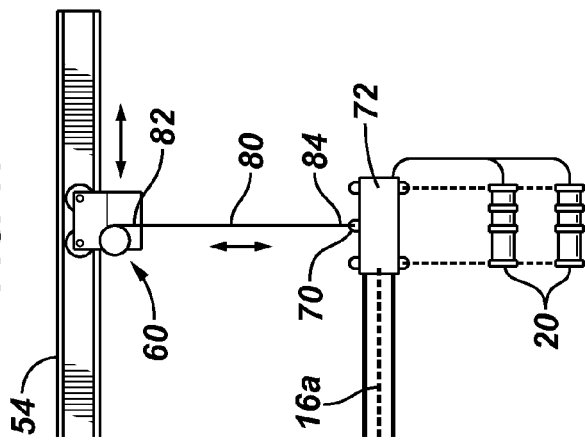
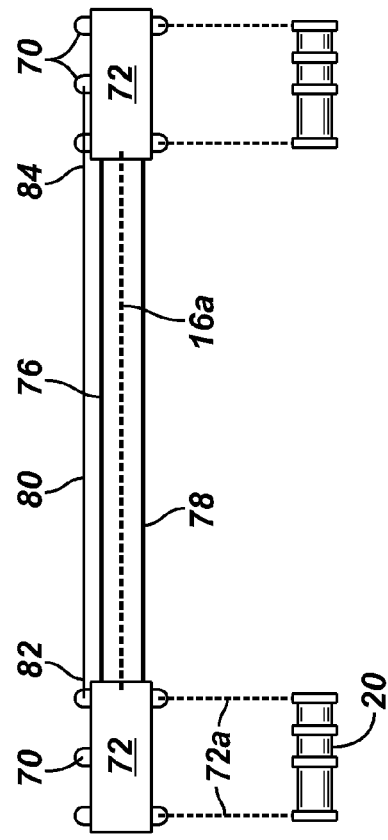
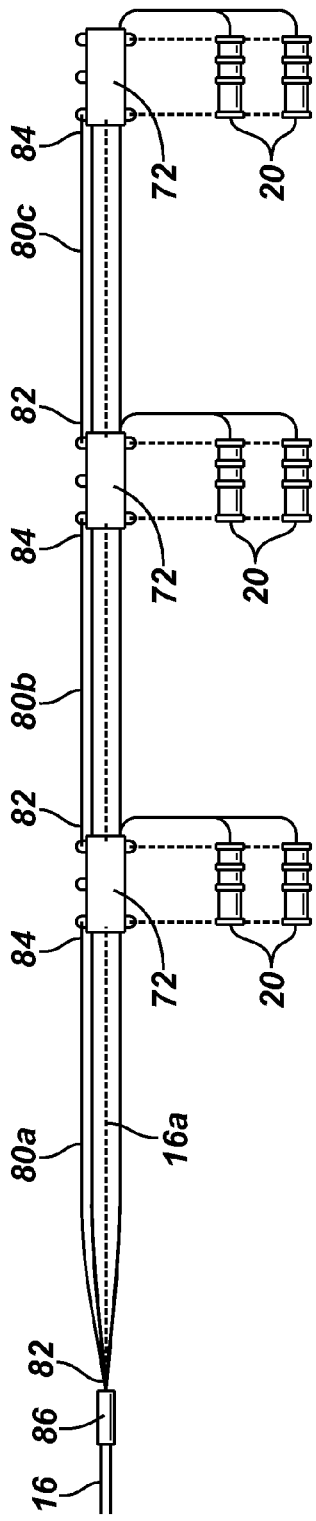

MARINE SEISMIC SOURCE HANDLING SYSTEM

RELATED APPLICATIONS

This application claims the benefit of U.S. Provisional Patent Application No. 61/093,627 filed on Sep. 2, 2008.

BACKGROUND

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

The present disclosure relates to systems and methods for deploying and/or retrieving equipment towed from a marine vessel and more particularly is related to deployment and retrieval systems and methods for seismic survey vessels.

Seismic exploration involves surveying subterranean geological formations, for example for hydrocarbon deposits. A survey typically involves deploying seismic source(s) and seismic sensors. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and/or sources is towed behind a survey vessel. The seismic sources are commonly referred to as source arrays and include one or more energy sources (e.g., acoustic source, electromagnetic source) such as an airgun. The source arrays may be towed behind a marine vessel that also tows the streamers and/or from a dedicated vessel (e.g., source vessel). The source arrays may be deployed and/or towed in various manners included stacked arrays and spread arrays.

The tow vessel typically includes a deck designed for storing and handling the seismic gun cables and detection cables or streamer cables, which constitute the means whereby the seismic surveys are performed. The source arrays and/or streamers are commonly transported to a slip area from the storage area of the vessel for deploying into the water and the source arrays and streamers are retrieved from the water at the from the slip area of the vessel and then transported to the storage area.

In regard to the source arrays, it is typical for various manual operations to be performed in the slip area in order to deploy and to retrieve the source arrays. For example, various source array equipment such as the gun assembly, floats, etc. may be transported into the slip area via a device referred to generally as a trolley. Often, the trolley is provided via a rail into the slip area. Inside of the slip area and often at the slipway (e.g., opening to the water) personnel disconnect, for example, the gun assemblies from their transporting trolleys so that the gun assembly may be introduced into the water on its tow cable. It is common for the gun assemblies to weigh at least 0.5 tons. Similarly, when retrieving the source arrays manual operations are required in the slip area and in dangerous proximity to the water, for example, connecting the retrieved gun assemblies to trolleys for movement back into the slip area and ultimately into the storage area.

A seismic source handling system, according to one or more aspects of the present disclosure, for deploying and/or retrieving a seismic source array having a gun assembly from a marine vessel may include a tow winch disposed on the vessel capable of deploying and/or retrieving a tow member connected to the source array; an elevated handling beam extending from an inboard position to an outboard position proximate to an open slipway; and a beam winch moveably disposed on the handling beam, the beam winch selectively connectable to the gun assembly.

A method, according to one or more aspects of the present disclosure, for deploying and/or retrieving a seismic source array from a marine vessel having a slip with an open slipway to the water may include locating a gun assembly proximate to the slip at a position distal from the slipway; elevating the gun assembly; moving the gun assembly laterally to a position proximate to the slipway; and deploying the gun assembly into the water.

Another method, according to one or more aspects of the present disclosure, includes positioning an elevated handling beam in a slip of a marine vessel, the handling beam extending from an inboard position to a outboard positioned proximate to an open slipway; and moveably positioning a handling winch on the handling beam, the handling winch capable of selectively connecting with a gun assembly and moving the gun assembly vertically and laterally relative to the handling beam.

BRIEF DESCRIPTION OF THE DRAWINGS

The present disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 9 is a schematic view of an apparatus according to one or more aspects of the present disclosure.

FIG. 10 is a schematic view of an apparatus according to one or more aspects of the present disclosure.

FIG. 11 is a schematic view depicting operation of an apparatus according to one or more aspects of the present disclosure.

DETAILED DESCRIPTION

Figure 1:
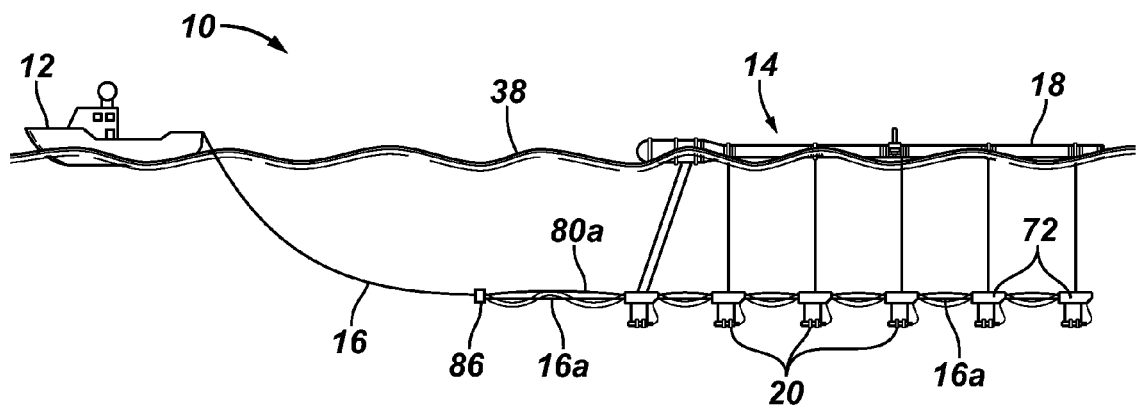
FIG. 1 is a schematic view of a marine system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is an elevation view of a portion of a marine seismic system, generally denoted by the numeral 10, according to one or more aspects of the present disclosure. System 10 comprises a vessel 12 (e.g., ship, tow vessel, etc.) towing a source array 14 via a tow member 16 (e.g., chain, rope, cable, etc.). As is known in the art, tow member 16 may include one or more members such as electrical conductors, hoses and/or tension bearing members. The depicted source array 14 includes a float 18 and a plurality of energy sources 20 (e.g., airguns, electromagnetic sources, etc.). Energy sources 20 will be referred to generally herein as "guns" and/or "gun assemblies." Gun assemblies 20 are described herein as including a hang plate 72 or other member from which the gun (e.g., energy source) may be hung, for example by chains. Gun assemblies 20 commonly include a hang plate, controller electronics (e.g., ultra box), connecting members (e.g., brackets, dog bones etc.) and high pressure pipe for example. A cluster gun assembly, e.g. an assembly comprising two guns, commonly weighs about 0.5 tons. Some examples of marine survey systems that may be utilized in whole or in-part are disclosed in: U.S. Pat. Nos. 7,466,625; 7,426,439; 7,415,936; 7,400,552; 6,684,160; 6,604,482; 5,488,920 and 5,351,218; and U.S. Patent Application Publication Nos. 2009/0141587; 2009/0003132; 2008/0267010; 2008/0186804; 2008/0144442; 2008/0008037; 2007/0025182 and 2006/0246654; all of which are incorporated herein by reference. One type of EM surveying is referred to as controlled source EM surveying (CSEM), in which an EM transmitter (e.g., source) is used to generate EM signals, with the reflected EM signals received by the EM receivers.

Figure 2:
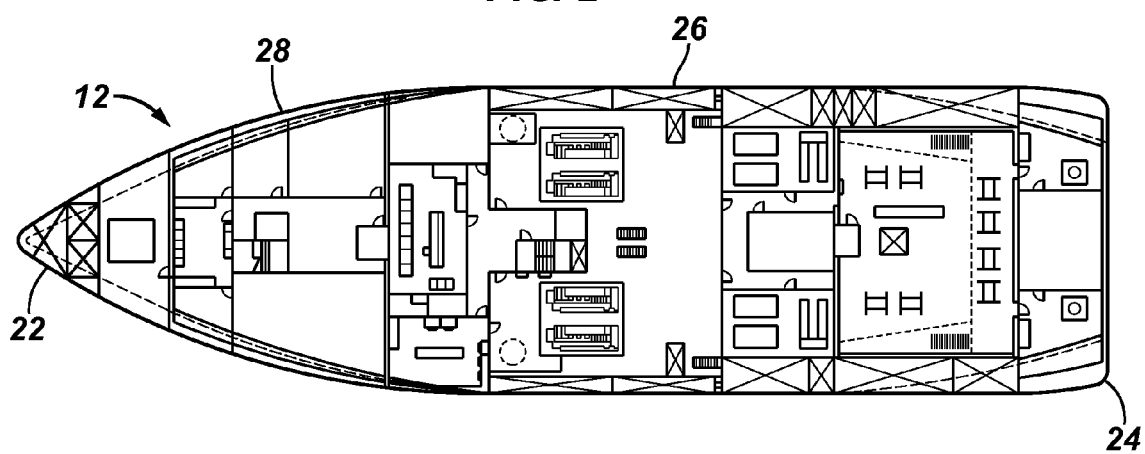
FIG. 2 is a schematic, aerial view of a marine vessel according to one or more aspects of the present disclosure.
Figure 3:
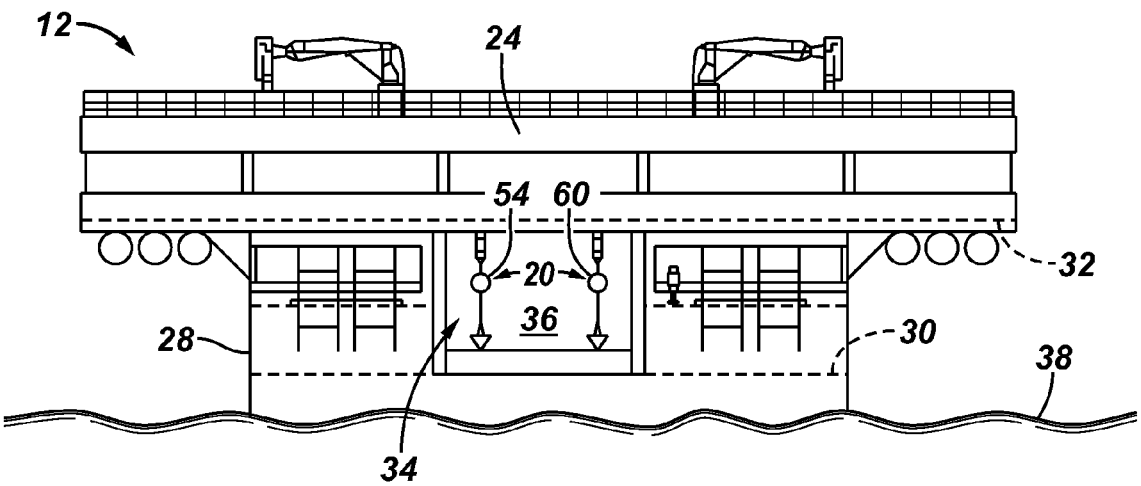
FIG. 3 is a schematic, elevation view of a marine vessel according to one or more aspects of the present disclosure.

FIG. 2 is an aerial view of a vessel 12 according to one or more aspects of the present disclosure. FIG. 2 depicts the bow 22, stern 24 and center section 26 of vessel 12 formed by the hull 28. FIG. 3 is an elevation view of stern 24 of vessel 12 according to one or more aspects of the present disclosure. In the depicted embodiment vessel 12 comprises a gun deck 30 positioned below a streamer deck 32.

FIG. 3 illustrates an opening 34 (e.g., slipway) into an area of gun deck 30 referred to herein as a slip 36, or gun slip. Slip 30 is the area of vessel 12 at which cables 16 and gun assemblies 20 are deployed into the water 38. Slip 36 is depicted at the stern of the ship herein. In some embodiments, streamers (not illustrated) may also be deployed and/or recovered from slip 36. For purposes of brevity and clarity the present disclosure is described with reference to deploying and retrieving source arrays from the stern of the vessel. It may be desired to deploy and/or retrieve equipment, including the source arrays, from the starboard and/or port sides of the vessel.

Figure 4:
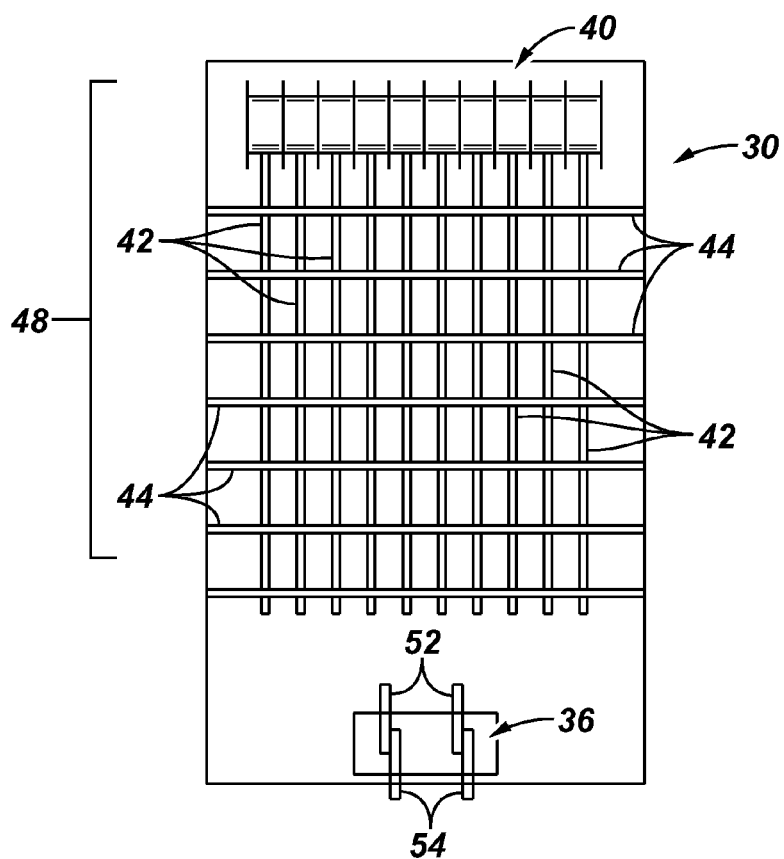
FIG. 4 is a schematic, plan view of a gun deck according to one or more aspects of the present disclosure.

FIG. 4 is an aerial view of a prior art gun deck 30 depicting one or more aspects according to the present disclosure. Vessel 12 may include a storage area 48 (FIG. 4) to store equipment such as gun assemblies 20, tow members 16, etc. according to one or more aspects of the present disclosure. Storage area 48 is connected to slip 36 via a transport system. FIG. 4 depicts a gun drum 40 (e.g., winches), and a transport system comprising tracks 42. In the depicted embodiment, tracks 42 are moveably connected with cross-rails 44.

Figure 5:
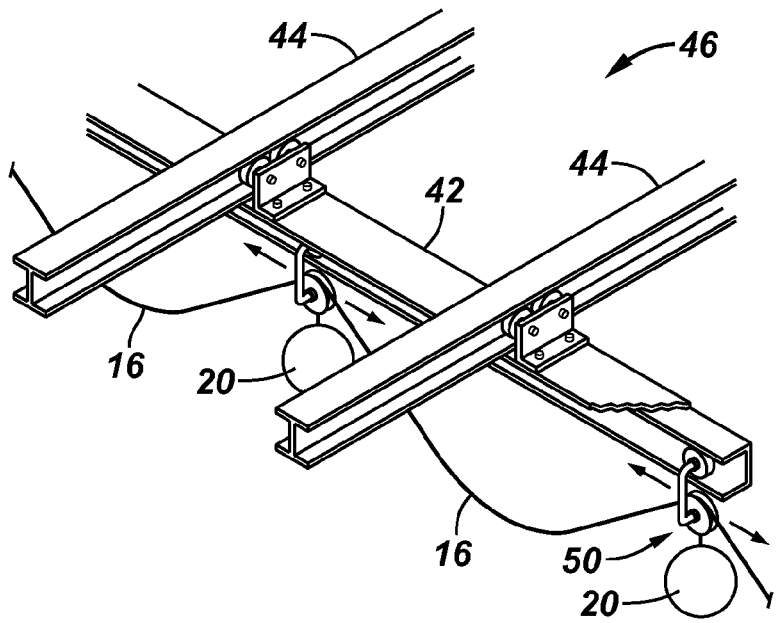
FIG. 5 is a schematic view of a system according to one or more aspects of the present disclosure.

FIG. 5 is a schematic view of a portion of transport system 46 according to one or more aspects of the present disclosure. Traditionally, gun assemblies 20 and tow members 16 are transported between storage area 48 and slip 36 via trolleys 50. In the prior systems, source arrays 14, e.g., gun assemblies 20, are deployed into the water and/or retrieved from the water utilizing a guide rail 52 in slip 36. Examples of one or more aspects of the present handling system are disclosed in U.S. Pat. Nos. 6,604,483 and 5,488,920 which are incorporated herein by reference.

Figure 6:
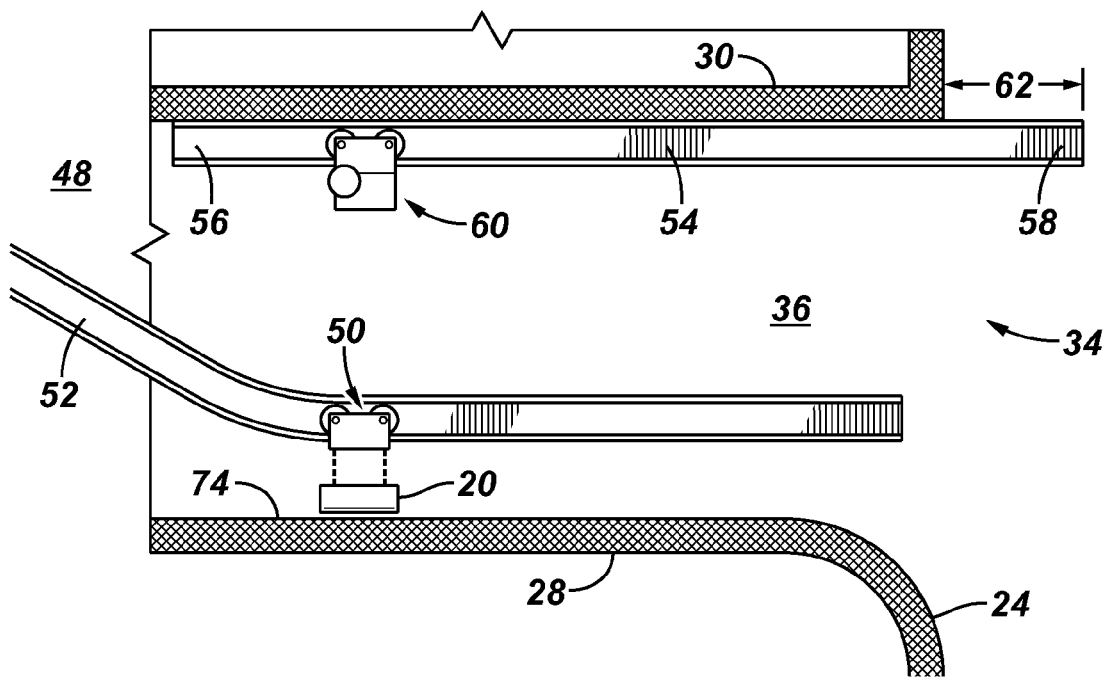
FIG. 6 is a schematic view of a slip according to one or more aspects of the present disclosure.

FIG. 6 is a schematic, elevation view of a slip 36 according to one or more aspects of the present disclosure. FIG. 6 depicts guide rail 52 leading from storage area 48 into slip 36. Traditionally, a trolley-rail type system is utilized to hang and move gun 20 assemblies to and from slip 36. In slip 36, personnel are responsible for detaching gun assemblies 20, for example, from trolleys 50 during deployment and attaching gun assemblies 20, for example, to trolleys 50 in retrieval operations. Performing these manual operations in the slip 36, and in particular at the outside edge of slip 36 (e.g., slipway 34), raises quality, health, safety and environment concerns. According to one or more aspects of the present disclosure, these manual operations are moved at least away from slipway 34.

FIG. 6 depicts a handling beam 54 positioned in an elevated position in slip 36 relative to guide rail 52 for example. In the depicted example, track beam 54 extends from an inboard position 56 to an outboard position 58 and is connected to the ceiling of the gun deck 30. In the depicted embodiment, handling beam 54 extends to a distance, identified as 62, of at least about 1.0 meter outside of the slip 36 relative to hull 28. A winch 60 (e.g., handling winch) is disposed on handling beam 54. In the depicted embodiment winch 60 is motorized for lateral movement between ends 56 and 58.

Figure 7:
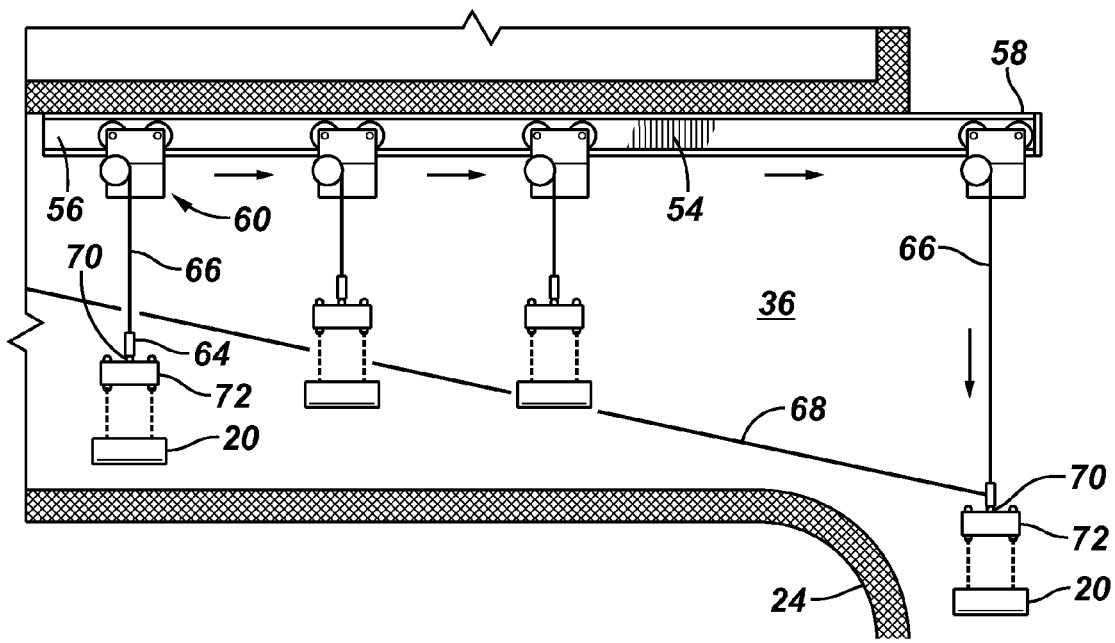
FIG. 7 is a schematic illustration of a method according to one or more aspects of the present disclosure.

FIG. 7 is a schematic illustration of a method for deploying and/or retrieving equipment according to one or more aspects of the present disclosure. An embodiment of a method is described in relation to deploying gun assemblies 20 with reference in particular to FIGS. 1-8C. Handling beam 54 and handling winch 60 are provided in slip 36. In the depicted embodiment, outboard position 58 extends outside of the vessel at least about 1.0 meter. A quick connect type connection device 64 (e.g., connector) is provided with winch cable 66 of handling winch cable 60.

Figure 8A:
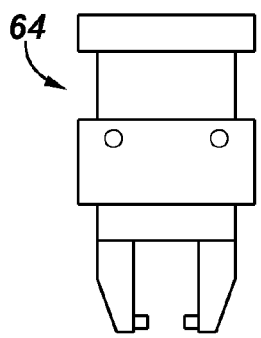
FIGS. 8A-8C are schematic views of apparatus according to one or more aspects of the present disclosure.
Figure 8B:
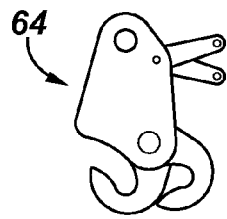
Figure 8C:
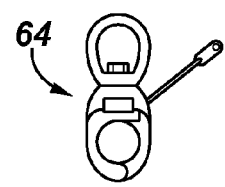

FIGS. 8A, 8B, 8C illustrate examples of some quick connect type connection devices 64 according to one or more aspects of the present disclosure. Connection devices 64 are each adapted to be open and closed via remote control (e.g., wire, wirelessly). For example, connection device 64 depicted in FIG. 8A is a powered (e.g., electric, hydraulic, pneumatic) device that may be operated between an open and closed position via a control line 68 (FIG. 7) and/or via wireless communication. FIGS. 8B and 8C are examples of manually operated connection devices 64 which may be operated between and open and closed position via control line 68 (FIG. 7) such as a cable, rope, chain, or the like. For example, control line 68 may be placed in tension (e.g., pulled) to operate a manually operated connection device 64.

Gun assembly 20 is positioned in slip area 36 for example by transporting from storage area 48. In FIG. 6 gun assembly 20 is depicted disposed on trolley 50 and guide rail 52. Connection device 64 is then connected to gun assembly 20, for example, via connection eye 70 (e.g., pad eye) of hang plate 72 (e.g., gun assembly 20). Winch 60 is then operated, lifting gun assembly 20 relative to guide rail 52. Gun assembly 20 is disconnected from trolley 50 (FIG. 6) and suspends from winch 60 and handling beam 54. Winch 60 is moved, carrying gun assembly 20, toward outboard position 58 of handling beam 54. Proximate to the exterior end of slip 36 (e.g., slipway 34), winch 60 is operated to lower gun assembly 20 to the floor 74 (FIG. 6) of slip 36 or into the water. Connection device 64 is operated to the open position, disconnecting (e.g., detaching, releasing) connection device 64 and winch cable 66 from gun assembly 20. Gun assembly 20 is either released into the water or moved to the water from the end of slip 36. Gun assembly 20 may be introduced into the water by gravity at the end of slip 36. An example of lowering gun assembly 20 into the water from the floor of gun deck 30 may include releasing tow member 16 from gun drum 40 (FIG. 4).

FIG. 9 is a schematic of source array 14 according to one or more aspects of the present disclosure. As noted, gun assemblies 20 may include hang plates 72 from which the operable energy source is suspended via chains 72a, for example. Gun assemblies 20 are depicted interconnected by tow member portion 16a (e.g., chain), a harness 76 and a high pressure air hose 78 as is common. The depicted embodiment further discloses a handling tether 80 (e.g., rope, wire, cable etc.) having a first end 82 and a second end 84. The first end 82 is connected to one gun assembly 20, via hang plate 72 for example, and the second end 84 is connected to an adjacent gun assembly 20, vial hang plate 72, for example. Tether 84 may connect in various manners (e.g., loops, latches, quick connects, etc.) to gun assembly 20 as known in the art consistent with the type tether utilized.

FIG. 10 is a schematic of a source array 14 comprising three gun assemblies 20 designated from left to right as the first, second and third gun assemblies or gun positions. For purposes of description, the first gun position is depicted as the gun closest to vessel 12 when deployed (FIG. 1). Gun assemblies 20 are depicted in FIG. 10 as gun clusters comprising for example two operable energy sources suspended from hang plate 72. In the depicted embodiment, first end 82 of handling tether 80a is connected to tow member 16 and the second end 84 is connected to first gun assembly 20. The second handling tether 80b is connected between the first gun assembly 20 and the adjacent second gun assembly 20. The third tether 80c is connected between the second gun assembly 20 and the adjacent third gun assembly 20. In the depicted embodiment, ends 82, 84 of the respective handling tethers 80a, 80b, 80c are connected to the respective gun assemblies at hang plates 72 of each gun assembly 20. However, the handling tethers may connect at positions other than hang plates 72, for example to the tow member portions 16a proximate to the respective gun assemblies.

FIG. 11 is a schematic view of a gun assembly 20 supported by a handling tether 80 according to one or more aspects of the present disclosure. The first end 82 of tether 80 is disconnected from an adjacent member (e.g., tow member 16, gun assembly 20) and is connected with handling winch 60 and track beam 54. The second end 84 remains connected to gun assembly 20 facilitating vertical movement (e.g., raising and lowering) and lateral movement (e.g., along handling beam 54) via handling winch 60.

Figure 12A:
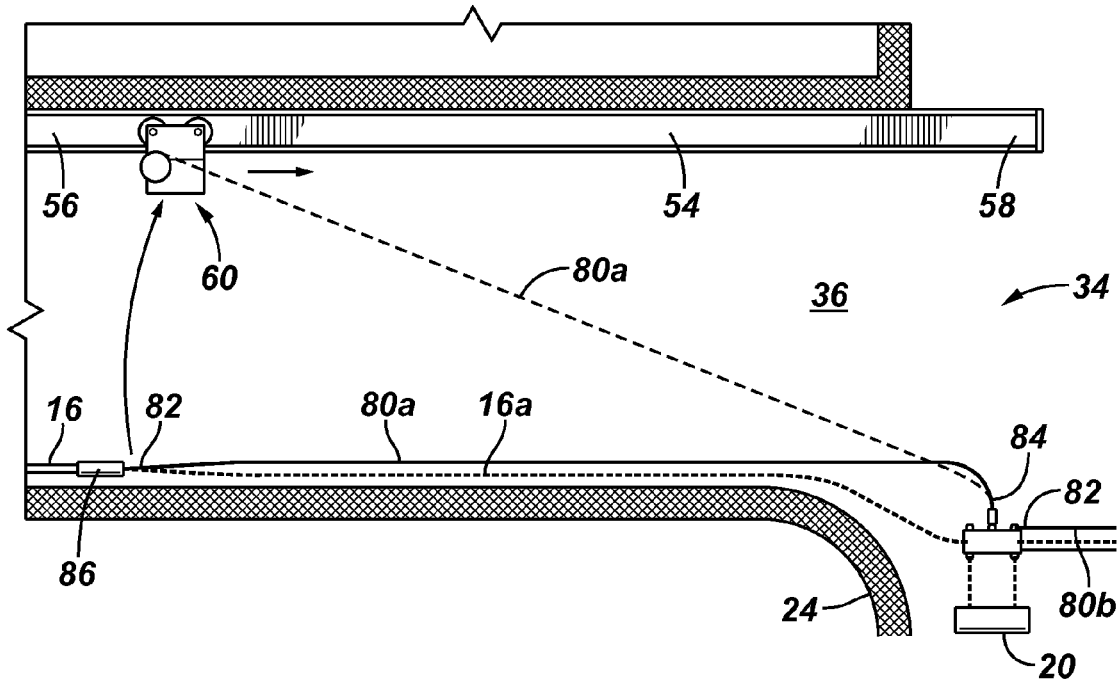
FIGS. 12A-12B is a schematic illustration of a method according to one or more aspects of the present disclosure.
Figure 12B:
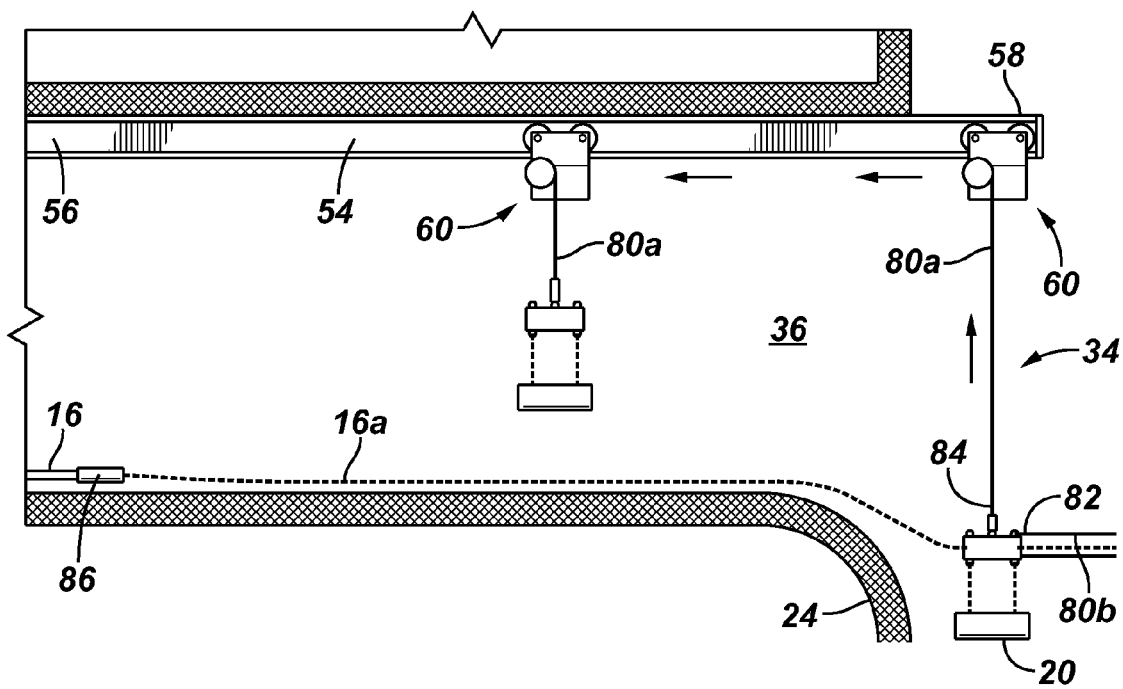

An embodiment of a method for deploying and/or retrieving source array 14, comprising a gun assembly 20, according to one or more aspects of the present disclosure is now described with reference to FIGS. 1 through 12B. FIGS. 12A and 12B schematically depict a method of retrieving a gun assembly 20 according to one or more aspects of the present disclosure. Gun assembly 20 is retrieved toward vessel 12, for example by retracting tow member 16 via gun drums 40 (FIG. 4). In FIG. 12A, gun assembly 20 is depicted as the first gun position (FIGS. 1 and 10). Handling winch 60 is depicted disposed on handling beam 54 at an inboard position distal from slipway 34. In the depicted embodiment the tow member bulkhead 86 is retrieved into slip 36. First end 82 of handling tether 80a is disconnected from source array 14, for example tow chain 16a, and is connected to handling winch 60 (FIG. 12A). Handling beam winch 60 is moved toward outboard position 58 of handling winch 54. Handling beam winch 60 may wind tether 80a (e.g., take up slack) as winch 60 moves toward outboard position 58 and gun assembly 20. With handling beam winch 60 proximate outboard position 58 it may be operated raising gun assembly 20 to a position to be moved laterally into vessel 12 via slip 36. Winch 60 is operated moving gun assembly 20 laterally into slip 36. Once gun assembly 60 is positioned a desired distance into slip 36 it may be lowered via handling winch 60. Once lowered a sufficient distance, gun assembly 20 may be transferred to trolley 50 and onto rails 52 and then 42 in storage area 48. First end 82 of handling tether 80a is disconnected from winch 60 and may be reconnected to source array 14, for example at tow chain 16a. The process is repeated until source array 14 is retrieved.

Deployment of source array 14 is performed substantially in the reverse order. For example with reference to the embodiment described with reference to FIG. 7, first end 82 of tether 80 is disconnected from source array 14 and connected to winch 60 proximate to inboard position 56. Winch 60 is operated, lifting gun assembly 20 connected to tether 80 at second end 84. Trolley 50 is disconnected and gun assembly 20 is suspended from handling beam 54 and winch 60 by tether 80 (FIG. 11). Gun assembly 20 is moved laterally toward outboard position 58 and gun assembly 20 is lowered to the floor of gun deck 30 at the outside edge of slip 36 (e.g., proximate to slipway 34). Winch 60 is operated to deploy tether 80 and handling winch 60 is moved back toward inboard position 56. First end 82 is disconnected from winch 60 and may be connected again to source array 14 (e.g., tow member 16, tow chain 16a, adjacent gun assembly 20, etc.). Gun drum 40 (e.g., winch) may then be operated to feed tow member 16 out lowering gun assembly 20 out of slipway 34 and into the water.

FIGS. 1 through 12B depict various aspects of the present disclosure so that other embodiments may be readily understood by those skilled in the art. The depicted embodiments were described with reference to retrieving and deploying a single layer of source arrays 14. It is readily understood by those in the art that the system may be utilized to deploy and/or retrieve one or more layers of source arrays. Additionally, the system may be used to floats 18 and other features of source array 14 as may be desired.

A seismic source handling system, according to one or more aspects of the present disclosure, for deploying and/or retrieving a seismic source array having a gun assembly from a marine vessel may include a tow winch disposed on the vessel capable of deploying and/or retrieving a tow member connected to the source array; an elevated handling beam extending from an inboard position to an outboard position proximate to an open slipway; and a beam winch moveably disposed on the handling beam, the beam winch selectively connectable to the gun assembly.

The system may include a tether having a first end and a second end, the first end selectively connectable with the source array and the beam winch and the second end connected to the gun assembly. The tether may be utilized to deploy the source array from the vessel and/or to retrieve the source array from the water into the vessel. The beam winch may include a cable and a connector held by the cable capable of being remotely operated between the open and closed position. A control line may be connected with the connector to remotely operate the connector between the open and closed position. The connector and beam winch may be utilized to deploy the source array. The connector and beam winch may be utilized to deploy and/or retrieve the source array. In some embodiments, the tether and remotely operable connector may be utilized for handling the source arrays.

A method, according to one or more aspects of the present disclosure, for deploying and/or retrieving a seismic source array from a marine vessel having a slip with an open slipway to the water may include locating a gun assembly proximate to the slip at a position distal from the slipway; elevating the gun assembly; moving the gun assembly laterally to a position proximate to the slipway; and deploying the gun assembly into the water.

Elevating the gun assembly may include connecting the gun assembly to an elevated winch via a cable and operating the winch. The cable may be a winch cable. The gun assembly may be connected to the cable via a connector that is remotely operable between an open and closed position. Elevating the gun assembly may include detaching a trolley (e.g., transportation device) from the gun assembly. The winch may be connected to the gun assembly via a connector and the connector may be deployed by remotely operating the connector to detach the gun assembly. Elevating the gun assembly may include disconnecting a first end of a tether from the source array, the tether having a second end connected to the gun assembly; and connecting the first end to an elevated winch. The cable may be the tether.

The method may include retrieving the deployed gun assembly. Retrieving the deployed gun assembly may include disconnecting a first end of a tether from the source array, connecting the first end to the winch positioned in the slip, raising the deployed gun assembly and moving the deployed gun assembly into the slip. According to at least one embodiment, the method may include deploying the gun assembly by remotely operating a connector to detach the gun assembly from the winch and the deployed gun assembly may be retrieved by disconnecting a first end of a tether from the source array, connecting the first end to the winch positioned in the slip, raising the deployed gun assembly and moving the deployed gun assembly into the slip.

Another method, according to one or more aspects of the present disclosure, includes positioning an elevated handling beam in a slip of a marine vessel, the handling beam extending from an inboard position to a outboard positioned proximate to an open slipway; and moveably positioning a handling winch on the handling beam, the handling winch capable of selectively connecting with a gun assembly and moving the gun assembly vertically and laterally relative to the handling beam.

The method may include the step of retrieving a source array from the water comprising disconnecting a first end of a tether from the source array, a second end of the tether connected to the gun assembly positioned proximate to the slipway; connecting the first end of the tether to the winch; moving the gun assembly via the winch into the slip proximate to the inboard position; disconnecting the first end from the winch; and reconnecting the first end to the source array. The method may further comprise connecting the connecting the gun assembly to a trolley inside of the slip and moving the gun assembly to a storage area via the trolley.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A seismic source handling system for deploying and/or retrieving a seismic source array having a gun assembly from a marine vessel, comprising:
    a tow winch disposed on the vessel capable of deploying and/or retrieving a tow member connected to the source array;
    an elevated handling beam extending from an inboard position to an outboard position proximate to an open slipway;
    a beam winch moveably disposed on the handling beam, the beam winch selectively connectable to the gun assembly; and
    a tether having a first end and a second end, the first end selectively connectable with the source array and the beam winch and the second end connected to the gun assembly.

2. The system of claim 1, wherein the beam winch comprises:
    a cable; and
    a connector held by the cable capable of being remotely operated between the open and closed position.

3. The system of claim 2, further comprising a control line connected with the connector to remotely operate the connector between the open and closed position.

4. A method for deploying and/or retrieving a seismic source array from a marine vessel having a slip with an open slipway to the water, comprising:
    locating a gun assembly proximate to the slip at a position distal from the slipway;
    disconnecting the gun assembly from a trolley proximate to the position distal from the slipway;
    elevating the gun assembly;
    moving the gun assembly laterally to a position proximate to the slipway; and
    deploying the gun assembly into the water.

5. The method of claim 4, wherein elevating comprises:
    connecting the gun assembly to an elevated winch via a cable; and
    operating the winch.

6. The method of claim 5, wherein the cable is a winch cable.

7. The method of claim 4, further comprising:
    connecting the gun assembly via a connector to an elevated winch; and wherein the deploying the gun assembly comprises remotely operating the connector to detach the gun assembly.

8. The method of claim 7, wherein moving the gun assembly laterally comprises moving the elevated winch.

9. The method of claim 4, wherein elevating comprises:
disconnecting a first end of a tether from the source array, the tether having a second end connected to the gun assembly; and
connecting the first end to an elevated winch.

10. The method of claim 4, wherein deploying comprises:
lowering the elevated gun assembly via a tether connected to a winch;
disconnecting a first end of the tether from the winch, a second end of the tether connected to the gun assembly;
connecting the first end to the source array; and
introducing the gun assembly into the water.

11. The method of claim 10, wherein elevating comprises:
disconnecting the first end of a tether from the source array; and
connecting the first end to an elevated winch.

12. The method of claim 4, further comprising retrieving the gun assembly from the water, comprising:
positioning the deployed gun assembly proximate to the slipway;
disconnecting a first end of a tether from the source array, the tether having a second end connected to the deployed gun assembly;
connecting the first end to a winch positioned in the slip;
raising the deployed gun assembly toward the winch; and
moving the deployed gun assembly into the slip and away from the slipway.

13. The method of claim 12, wherein:
connecting the first end to a winch positioned in the slip comprises disposing the winch in a position inboard relative to the slipway; and
raising the deployed gun assembly comprises moving the winch from the inboard position to a position proximate to the slipway.

14. The method of claim 12, further comprising:
connecting the gun assembly via a connector to an elevated winch at the position in the slip distal from the slipway; and
wherein the deploying the gun assembly comprises remotely operating the connector to detach the gun assembly.

15. A method comprising:
retrieving a source array from the water using a handling system comprising a handling beam elevated in a slip of a marine vessel and extending from an inboard position to a outboard position proximate to an open slipway, and a handling winch moveably positioned on the handling beam, the handling winch capable of selectively connecting with a gun assembly of the source array and moving the gun assembly vertically and laterally relative to the handling beam, the retrieving the source array comprising:
disconnecting a first end of a tether from the source array, a second end of the tether connected to the gun assembly positioned proximate to the slipway;
connecting the first end of the tether to the winch;
moving the gun assembly via the winch into the slip proximate to the inboard position;
disconnecting the first end from the winch; and
reconnecting the first end to the source array.

16. The method of claim 15, further comprising:
connecting the gun assembly to a trolley; and
moving the gun assembly to a storage area via the trolley.

17. The method of claim 15, wherein the winch is located proximate to the inboard position when the connecting the first end of the tether to the winch is performed.

18. A method for deploying and/or retrieving a seismic source array from a marine vessel having a slip with an open slipway to the water, comprising:
locating a gun assembly proximate to the slip at a position distal from the slipway;
elevating the gun assembly, comprising:
disconnecting a first end of a tether from the source array, the tether having a second end connected to the gun assembly; and
connecting the first end to an elevated winch;
moving the gun assembly laterally to a position proximate to the slipway; and
deploying the gun assembly into the water.

19. A method for deploying and/or retrieving a seismic source array from a marine vessel having a slip with an open slipway to the water, comprising:
locating a gun assembly proximate to the slip at a position distal from the slipway;
elevating the gun assembly;
moving the gun assembly laterally to a position proximate to the slipway; and
deploying the gun assembly into the water, comprising:
lowering the elevated gun assembly via a tether connected to a winch;
disconnecting a first end of the tether from the winch, a second end of the tether connected to the gun assembly;
connecting the first end to the source array; and
introducing the gun assembly into the water.

* * * * *